(12) United States Patent
Shalgi

(10) Patent No.: US 11,297,916 B2
(45) Date of Patent: Apr. 12, 2022

(54) WHEELED LUGGAGE CASE

(71) Applicant: ORG Group, LLC, Los Angeles, CA (US)

(72) Inventor: Netta Shalgi, Tel Aviv (IL)

(73) Assignee: ORG Group, LLC, Los Angeles, CA (US)

( * ) Notice: Subject to any disclaimer, the term of this patent is extended or adjusted under 35 U.S.C. 154(b) by 0 days.

(21) Appl. No.: 15/940,227

(22) Filed: Mar. 29, 2018

(65) Prior Publication Data
US 2018/0213900 A1 Aug. 2, 2018

Related U.S. Application Data

(63) Continuation of application No. PCT/IL2016/051068, filed on Sep. 29, 2016.
(Continued)

(51) Int. Cl.
*A45C 5/14* (2006.01)
*A45C 15/00* (2006.01)
(Continued)

(52) U.S. Cl.
CPC .................. *A45C 5/14* (2013.01); *A45C 5/03* (2013.01); *A45C 5/06* (2013.01); *A45C 13/02* (2013.01);
(Continued)

(58) Field of Classification Search
CPC .... A45C 5/14; A45C 5/03; A45C 5/06; A45C 13/02; A45C 13/262; A45C 13/30; A45C 13/34; A45C 13/385; A45C 15/00; A45C 15/06; A45C 2013/267; A45C 2013/306; B60B 3/00; B60B 3/001; B60B 23/00; B60B 1/125; B60B 3/048; B60B 19/12; B60B 37/10; B60B 2200/45; B60B 2380/12; B60B 2900/211; B60B 2900/325; B60B 2900/551; B60B 2900/721;
(Continued)

(56) References Cited

U.S. PATENT DOCUMENTS 1,495,093 A  *  5/1924 Mock .................. B60B 33/0002
                                                16/38
3,977,040 A  *  8/1976 Sugasawara ........ B60B 33/0028
                                                16/45
(Continued)

FOREIGN PATENT DOCUMENTS

CN       202156237 U     3/2012
CN       104352048 A     2/2015
(Continued)

OTHER PUBLICATIONS

International Search Report and Written Opinion for International Application No. PCT/IL2016/051068 dated Jan. 3, 2017, 10 pages.
(Continued)

*Primary Examiner* — Tri M Mai
(74) *Attorney, Agent, or Firm* — RMCK Law Group, PLC

(57) ABSTRACT

An axle-free wheel comprising: an outer rim member having a ground interface on an external surface thereof and an outer ball race or rolling race on an inner surface thereof; an inner rim member having an inner ball or rolling race on an outer surface thereof.

20 Claims, 17 Drawing Sheets

Related U.S. Application Data

(60) Provisional application No. 62/234,045, filed on Sep. 29, 2015.

(51) Int. Cl.

| | | |
|---|---|---|
| *A45C 13/02* | (2006.01) | |
| *A45C 15/06* | (2006.01) | |
| *A45C 13/34* | (2006.01) | |
| *B60B 23/00* | (2006.01) | |
| *B60B 3/00* | (2006.01) | |
| *A45C 5/03* | (2006.01) | |
| *A45C 5/06* | (2006.01) | |
| *A45C 13/26* | (2006.01) | |
| *A45C 13/30* | (2006.01) | |
| *A45C 13/38* | (2006.01) | |
| *B62B 1/12* | (2006.01) | |
| *B60B 37/10* | (2006.01) | |
| *B60B 19/12* | (2006.01) | |
| *B60B 3/04* | (2006.01) | |
| *H02J 7/00* | (2006.01) | |
| *H02J 7/02* | (2016.01) | |

(52) U.S. Cl.
CPC ............ *A45C 13/262* (2013.01); *A45C 13/30* (2013.01); *A45C 13/34* (2013.01); *A45C 13/385* (2013.01); *A45C 15/00* (2013.01); *A45C 15/06* (2013.01); *B60B 3/00* (2013.01); *B60B 3/001* (2013.01); *B60B 23/00* (2013.01); *B62B 1/125* (2013.01); *A45C 2013/267* (2013.01); *A45C 2013/306* (2013.01); *B60B 3/048* (2013.01); *B60B 19/12* (2013.01); *B60B 37/10* (2013.01); *B60B 2200/45* (2013.01); *B60B 2380/12* (2013.01); *B60B 2900/211* (2013.01); *B60B 2900/325* (2013.01); *B60B 2900/551* (2013.01); *B60B 2900/721* (2013.01); *B62B 2301/05* (2013.01); *B62B 2301/254* (2013.01); *H02J 7/0042* (2013.01); *H02J 7/025* (2013.01)

(58) Field of Classification Search
CPC ........... B60B 2301/05; B60B 2301/254; H02J 7/0042; H02J 7/025
See application file for complete search history.

(56) References Cited

U.S. PATENT DOCUMENTS

| | | | | |
|---|---|---|---|---|
| 5,797,661 | A | | 8/1998 | Lee et al. |
| 5,934,425 | A | * | 8/1999 | Sadow ................. A45C 13/262 |
| | | | | 16/408 |
| 5,992,588 | A | * | 11/1999 | Morszeck ............... A45C 5/14 |
| | | | | 190/18 A |
| 7,725,986 | B2 | * | 6/2010 | Tsai ....................... B60B 3/048 |
| | | | | 16/46 |
| 8,549,705 | B1 | * | 10/2013 | Wu ......................... B60B 37/10 |
| | | | | 16/31 A |
| 9,770,084 | B1 | * | 9/2017 | Shiekh .................... A45C 13/28 |
| 9,861,170 | B1 | * | 1/2018 | Hamaty ..................... A45C 9/00 |
| 9,914,327 | B2 | * | 3/2018 | Mangano ................. B60B 33/00 |
| 2010/0163359 | A1 | | 7/2010 | Shalgi |

FOREIGN PATENT DOCUMENTS

| | | | | |
|---|---|---|---|---|
| EP | 2578481 | A2 * | 4/2013 | ........... B62K 15/006 |
| GB | 967915 | * | 8/1964 | |
| WO | 2015063752 | A1 | 5/2015 | |

OTHER PUBLICATIONS

CN Search Report for Chinese Patent Application No. 201680069219.4 dated Jul. 16, 2019, 2 pages.

\* cited by examiner

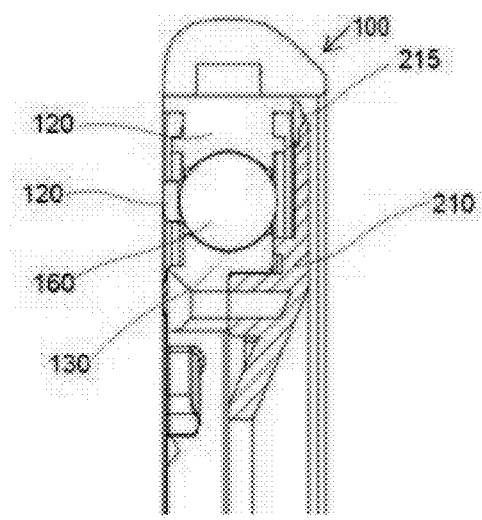
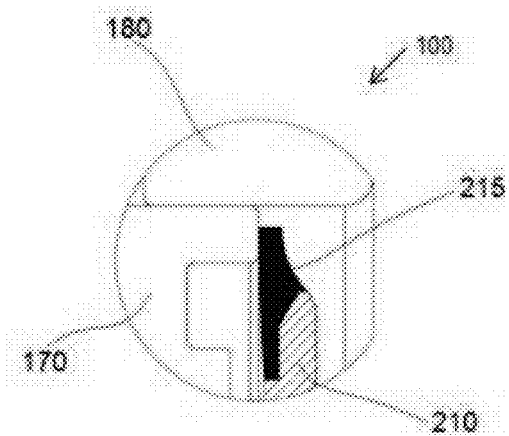
Fig. 3A  Fig. 3B
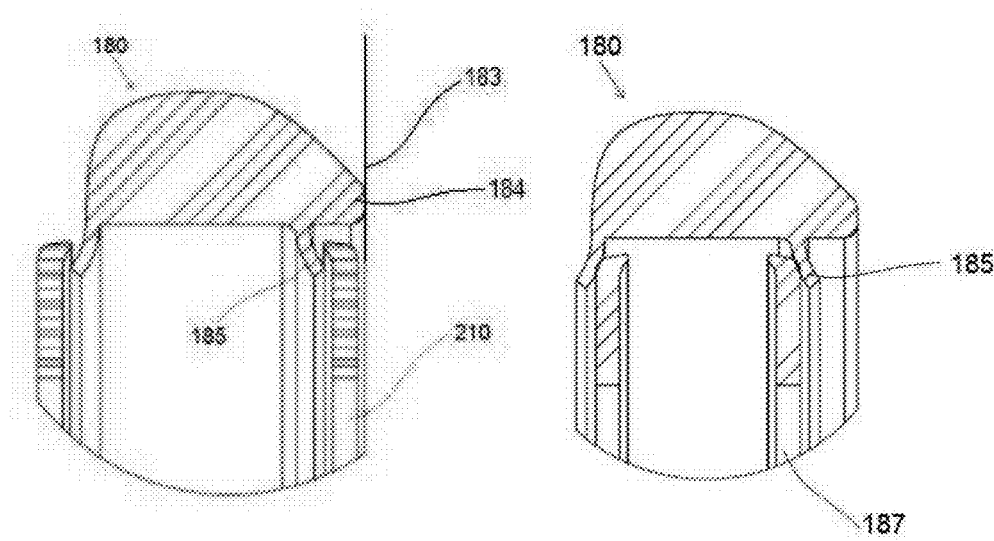
Fig. 4A  Fig. 4B

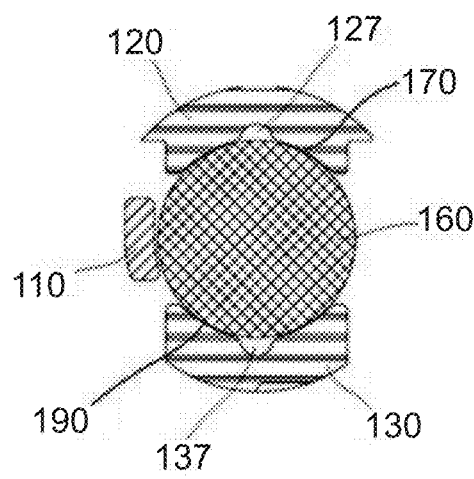 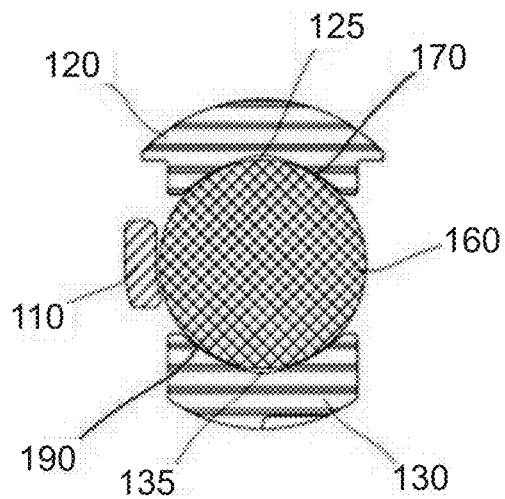
Fig. 6A    Fig. 6B
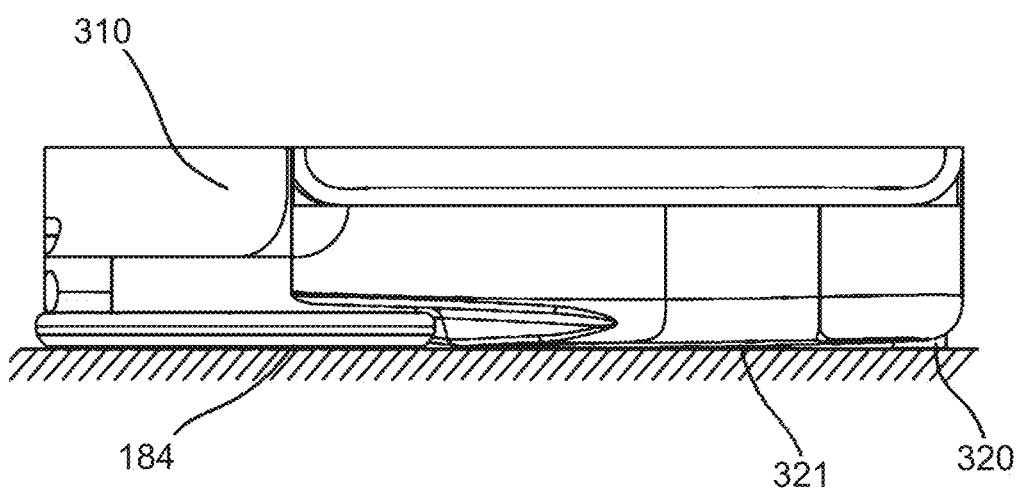
Fig. 7

WHEELED LUGGAGE CASE

CROSS REFERENCE TO RELATED APPLICATIONS

This application is a continuation of PCT International Application No. PCT/IL2016/051068, filed Sep. 29, 2016, which claims priority to and all of the advantages of U.S. Patent Application No. 62/234,045, filed Sep. 29, 2015. The disclosure of each of the above applications is incorporated herein by reference in their entirety.

FIELD OF THE INVENTION

The present invention relates to wheeled luggage, and, more specifically, to a case provided with an axle-free attachable wheels.

BACKGROUND OF THE INVENTION

A suitcase is a general term for a distinguishable form of luggage. It is mostly common shaped as flat, rectangular bag with impact-proof corners, either metal, hard plastic, semi hard or made of cloth, polymers, composite materials leather or any combination thereof. It has a carrying handle and is used mainly for transporting clothes and other possessions during trips. It has an opening side for access to its content and the different sections.

Many modern suitcases have built-in small wheels enabling them to be rolled along on surfaces by a fixed or extendable handle or by a retractable or stowable leash.

WO 2015/063752 discloses a wheeled luggage case comprising a storage chamber a cover defining an opening on at least one side of the storage chamber for providing ready access therein and at least two labyrinth axle-free wheels operatively connected to the chamber for towing the case along a ground surface. The labyrinth axle-free wheel comprises an internal rim, an external rim provided with a ground interface, rollers being rotatably disposed within a roller spacer between the internal and external rims in a uniform circumferential manner by means of a spacer and external covers. A labyrinth type dust passage in the wheel is defined by the rims and the external plates mechanically connected to the internal rim.

While in operation, rotating articles of the wheels are covered with dust and wheel rotation is hampered. Thus, there is a long-left and unmet need to provide a wheeled luggage case which ensures safe operation in dusty, icy, wet, humid, uneven surface, snow and slippery conditions.

SUMMARY OF THE INVENTION

It is hence one object of the invention to disclose an axle-free wheel comprising: (a) an outer rim member having a ground interface on an external surface thereof and an outer ball race or ball or rollers or similar on an inner surface thereof; (b) an inner rim member having an inner ball race on an outer surface thereof; and (c) a plurality of rolling means distributed between said inner and outer ball races by a separator.

It is a core purpose of the invention to provide the axle-free wheel further comprising attachment means configured for attaching said axle-free wheel to an object to be transported.

It is another object of the invention to disclose rolling means which is a plurality of balls or rollers.

It is a further object of the invention to disclose quick attachment means selected from the group consisting of mechanical bayonet means, magnetic means, reversibly gluing means, screws and others It is a further object of the invention to disclose the outer and inner rim members made of a resilient (material such that said outer and inner rim members are elastically stretchable to provide the axle-free wheel with dismountability thereof.

It is further object of the invention to disclose the wheel comprising at least one side external cover attachable to said wheel.

It is further object of the invention to disclose a side bayonet means comprising stopper means.

It is further object of the invention to disclose the stopper means selected from the group consisting of a stopper screw, a first magnetic fixture, a click, a snap, a screw and any combination thereof.

It is further object of the invention to disclose the wheel comprising a gasket seal disposed between said outer rim member and said external cover.

It is further object of the invention to disclose the ground interface which is a tire;

It is further object of the invention to disclose the tire having at least one sealing side rim fixatable by said external cover.

It is further object of the invention to disclose the external cover fixatable by means of a coupling pawl.

It is further object of the invention to disclose the external cover fixatable by means of a second magnetic fixture.

It is further object of the invention to disclose the external cover fixatable by means of a second snap fixture. It is further object of the invention to disclose at least one of said outer and inner ball races having a circumferential groove It is further object of the invention to disclose a wheeled luggage case comprising: (a) a storage chamber; (b) a cover defining an opening on at least one side of said storage chamber for providing ready access therein; and (c) at least two axle-free wheels operatively connected to said chamber for towing said case along a ground surface in a tilted position.

It is further object of the invention to disclose the case comprising a telescopic handle having an open reinforcing profile configured for receiving attaching screws mechanically interconnecting said telescopic handle and a wall of said storage chamber.

It is further object of the invention to disclose the telescopic handle clampable in at least two positions.

It is further object of the invention to disclose the telescopic handle configured for supporting an additional load being placed thereonto.

It is further object of the invention to disclose the case comprising at least one supporting shoe in a plane of an external surface of said axle-free wheel such that said case is placeable on a side face thereof.

It is further object of the invention to disclose the case comprising a compartment having a sealable cover.

It is further object of the invention to disclose the case comprising a chargeable battery connectable to an electricity source for charging thereof and to user's mobile device for energizing of charging thereof.

It is further object of the invention to disclose the user's mobile device is placeable into an element selected from the group consisting of an outer support, an outer partition, inner partition, an outer recess and any combination thereof.

It is further object of the invention to disclose the chamber and cover in a hinge like manner movable relative to each other up to 180°.

It is a further object of the invention to disclose the chamber and cover movable relative to each other up to 270° opening.

It is a further object of the invention to disclose the chamber and cover movable in a hinge-like yet stretchable and optionally twistable and flexible manner especially due to textile connection of chamber and cover.

It is further object of the invention to disclose the storage chamber compartmentalized by dividers braced to said chamber and cover such that formed compartments are openable when said cover is opened.

It is further object of the invention to disclose the case comprising a collapsible bracket for supporting said additional load.

It is further object of the invention to disclose the bracket is hingedly connected to said case.

It is further object of the invention to disclose the bracket collapsible in a sliding manner.

It is further object of the invention to disclose the case comprising connecting means for towing said case in a group manner.

It is further object of the invention to disclose the case comprising at least two supporting members for stabilizing said case in a vertical position.

It is further object of the invention to disclose the case comprising at least one supporting member any side for stabilizing said case in a vertical position.

It is further object of the invention to disclose the members which are rotatable rollers.

It is further object of the invention to disclose the members which are replaceable rotatable rollers.

It is further object of the invention to disclose rotation axes of said rollers oriented perpendicular to rotation axes said axle-free wheels.

It is further object of the invention to disclose the rollers which are of tapered conical shape with wider conical face directed outwards said case.

It is further object of the invention to disclose the case comprising supporting members disposed on a side surface of said case for supporting said case lying sidelong. The case rests on an outer tire rim of said axle-free wheel and said supporting members thereat said outer tire rim and supporting members belong to one plane.

It is further object of the invention to disclose the chamber and cover interconnectable by a zipper fastener.

It is further object of the invention to disclose the zipper fastener comprising double zipper arrangement further comprising an internal zipper interconnecting a greater enclosure and an external zipper interconnecting a smaller enclosure.

It is further object of the invention to disclose the chamber and cover interconnectable by a zipper fastener.

It is further object of the invention to disclose the zipper fastener comprising double zipper arrangement further comprising an internal zipper interconnecting a greater enclosure and an external zipper interconnecting a smaller enclosure.

It is further object of the invention to disclose replaceable decorative panels characterized by different colors and texture materials and other customized possibilities.

It is a further object of the invention to disclose a method for measuring and reporting distance travelled on wheels.

It is further object of the invention to disclose a Hall Effect sensor operatively disposed therewithin for measuring a mileage of said case.

It is a further object of the invention to provide an application for receiving data from said Hall Effect sensor and reporting said mileage to a user.

It is a further object of the invention to disclose a method of measuring rotations of the wheels.

It is further object of the invention to disclose the telescopic handle has an elongate configuration for decreasing a towing force to be applied by a user.

It is further object of the invention to disclose the case comprising a wireless charging pad applicable for user's mobile device.

It is further object of the invention to disclose the case comprising artificial illumination for additional visibility thereof.

It is a further object of the invention to disclose the case comprising at least partially transparent or translucent plates covering said artificial illumination.

It is further object of the invention to disclose the case comprising an application controlling said artificial illumination.

It is a further object of the invention to disclose the case comprising a settable weight threshold control mechanism adapted for alerting the user when weight of luggage is above or below predetermined weight threshold limits upon lifting by handle.

It is further object of the invention to disclose the case comprising an embedded umbrella.

It is further object of the invention to disclose the case comprising chargeable battery power means.

It is further object of the invention to disclose the case comprising a computer means conformable with office organizer means.

Other objectives, features, and advantages of the present invention will appear from the following detailed disclosure, from the attached dependent claims as well as from the drawings.

BRIEF DESCRIPTION OF THE DRAWINGS

These and other aspects of the present invention will now be described in more detail, with reference to the appended drawings showing at least one example embodiment of the invention, wherein:

In order to understand the invention and to see how it may be implemented in practice, a plurality of embodiments is adapted to now be described, by way of non-limiting example only, with reference to the accompanying drawings, in which

FIG. 3A is a schematic partial cross-sectional view of a sealed axle-free wheel;

FIG. 3B is an enlarged cross-sectional view of sealing arrangement;

FIGS. 4A and 4B are enlarged cross-sectional view of a tire provided with sealing rims;

FIGS. 6A and 6B are enlarged partial cross-sectional views of balls between ball races provided with circumferential grooves;

FIG. 7 is a side view of a case lying sidelong;

DETAILED DESCRIPTION OF PREFERRED EMBODIMENTS

The following description is provided, so as to enable any person skilled in the art to make use of said invention and sets forth the best modes contemplated by the inventor of carrying out this invention. Various modifications, however, are adapted to remain apparent to those skilled in the art, since the generic principles of the present invention have been defined specifically to provide an axle-free wheel and a luggage case provided with the aforesaid axle-free wheels.

The term "axle-free wheel" refers hereinafter to a wheel mechanically attachable to a planar plane, whereat a wheel plane is parallel to the plane of attachment.

The term "ground interface" refers hereinafter to a member circumferentially distributed over the external rim member and which is able to be in contact with the ground.

Figure 1A:
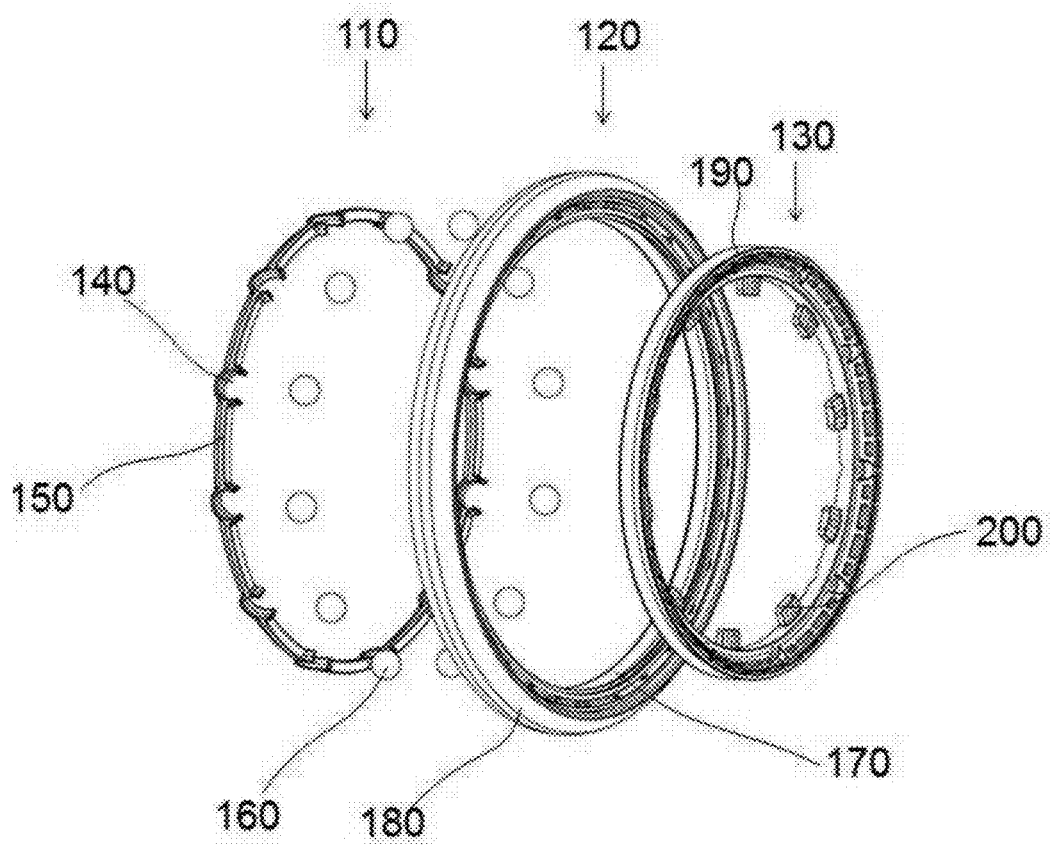
FIG. 1A is an exploded isometric view of an axle-free wheel.

Reference is now made to FIG. 1A showing an exploded isometric view of an axle-free wheel. Specifically, the wheel comprises outer rim member 120 having ground interface 180 on its external surface and outer ball race 170 on its inner surface; inner rim member 130 having inner ball race 190 on its outer surface; and a plurality of balls 160 uniformly distributed between said inner and outer ball races 170 and 190, respectively, by separator 110, which have open ball holder portions 140 and crossbar portions 150.

Inner rim member 130 is provided with bayonet members 200 configured for connecting to its counterpart attached to a case (as described below).

Figure 1B:
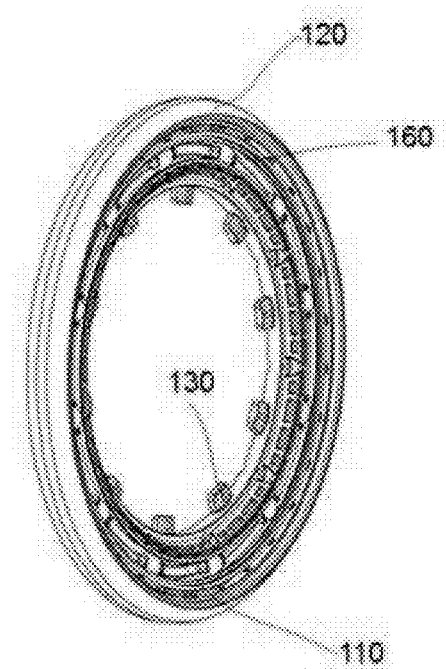
FIG. 1B is an isomeric view of an assembled axle-free wheel.
Figure 1C:
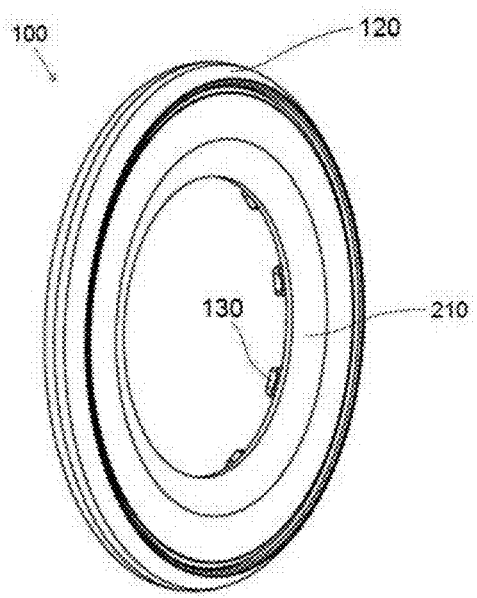
FIG. 1C is a an isomeric view of an axle-free wheel with a cover.

FIG. 1B shows an axle-free wheel in a partially assembled position without cover 210 while FIG. 1C presents assembled axle-free wheel covered by cover 210.

Figure 2A:
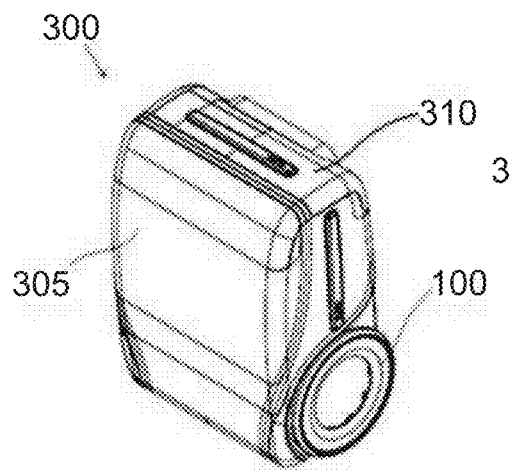
FIG. 2A is an isometric view of a case.

Reference is now made to FIG. 2A showing a layout of wheeled case 300 of the present invention.

According to one embodiment of the present invention, outer and inner rim 120 and 130 members, respectively, are made of an elastically stretchable material. Outer and inner rim members 120 and 130 can be stretched for easily taking the axle-free wheel to pieces, cleaning its elements and reassembling.

Reference is now made to FIG. 2A showing a layout of wheeled case 300 of the present invention. Wheeled case 300 comprises chamber 310 and chamber cover 305. Axle-free wheels 100 are attached to side surfaces of chamber 310.

Figure 2B:
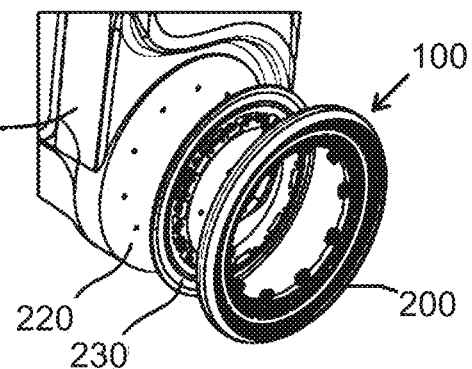
FIG. 2B is an enlarged exploded isometric view of a wheel portion of a case.

Reference is now made to FIG. 2B showing an exploded view of attachment arrangement of axle-free wheel 100 having bayonet tabs 200, bayonet base 230 and bearing plate 220 attached to the side surface of chamber 310.

Figure 2C:
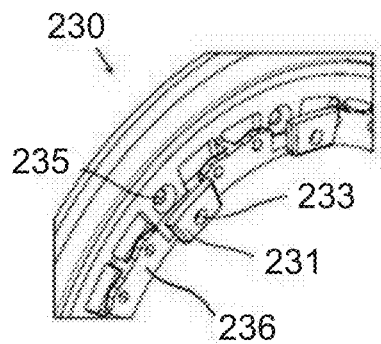
FIG. 2C is an enlarged view of a bayonet fixture.

Reference is now made to FIG. 2C showing an enlarged partial view of bayonet base 230 having grips 231 and supporting surface 236. When axle-free wheel 100 is mounted, bayonet tabs 200 are inserted under grips 231. Bayonet tabs 200 can be arrested by stopper screws (not shown) threaded into bores 233 and 235.

Figure 2D:
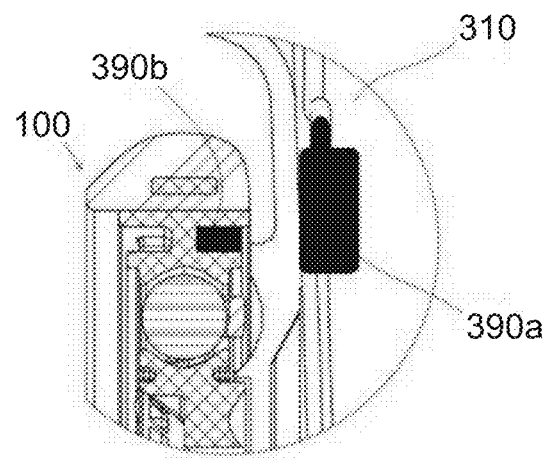
FIG. 2D is a schematic cross-sectional view of a Hall sensor for mileage measuring.

Reference is now made to FIG. 2D showing a schematic partial cross-sectional view of axle-free wheel 100 attached to chamber 310 and arrested by a magnetic stopper fixture comprising two counterpart articles 390a and 390b. Attaching axle-free wheel 100 by magnetic attaching means is also in the scope of the present invention.

Reference is now made to FIGS. 3A and 3B showing cross-sectional views of axle-free wheel 100 provided with gasket seal 215 preventing dust penetration of dust via a potential gap between outer rim member 120 and cover 210.

Reference is now made to FIGS. 4A and 4B showing partial cross-sectional views of axle-free wheel 100 where tire 180 is provided with sealing side rim 185 which can be fixated by cover 210 of an internal article 187. Numeral 183 refers to a plane 183 defined by a side outer tire rim 184 which contacts to the ground when axle-free wheel 100 is placed onto the ground.

Figure 5A:
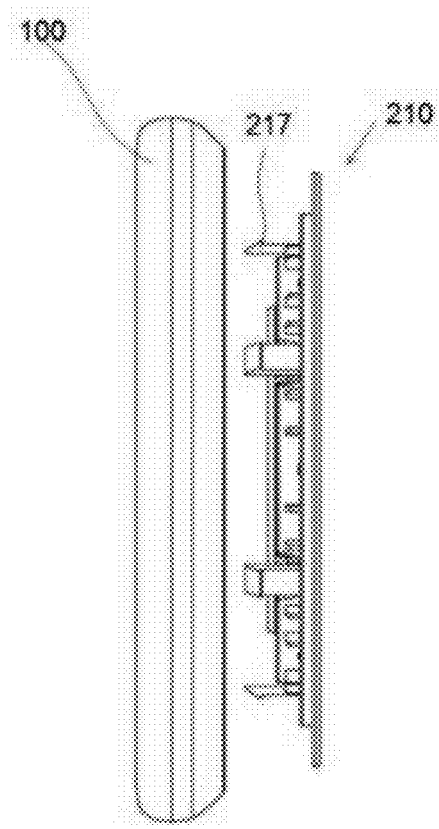
FIG. 5A is an exploded side view of an axle-free wheel and a cover provided with a coupling pawl.
Figure 5B:
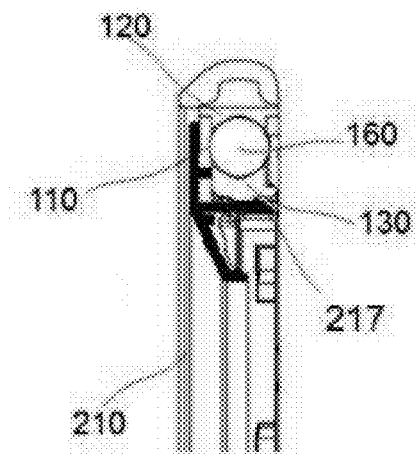
FIG. 5B is a schematic cross-sectional view of an axle-free wheel and a cover provided with a coupling pawl in an assembled position.
Figure 5C:
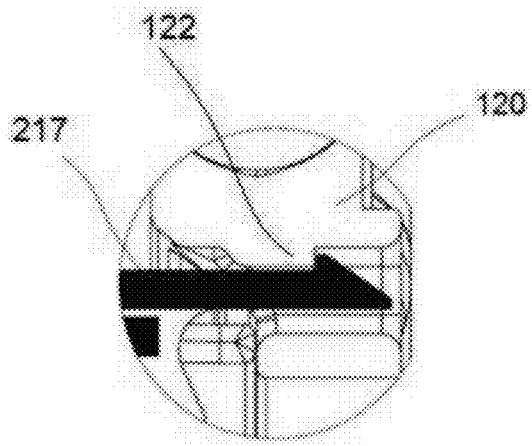
FIG. 5C is enlarged cross-sectional view of coupling pawl arrangement.

Reference is now made to FIGS. 5A to 5C showing cross-sectional views of axle-free wheel 100 which illustrate pawl coupling mechanism used for attaching cover 210 to inner rim member 130. Cover 210 has pawl 215 coupling with a step 122 and fixating cover 210 on inner rim member 120.

Figure 5D:
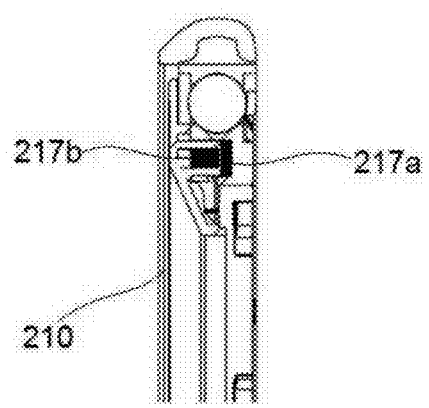
FIG. 5D is a schematic cross-sectional view of an axle-free wheel and a cover provided with a second magnetic fixture in an assembled position.

Reference is now made to FIG. 5D showing a second magnetic fixture alternatively functioning as means attaching cover 210 to inner rim member 120. Two magnetic counterpart articles are indicated as 217a and 217b.

Reference is now made to FIGS. 6A and 6B showing exemplar circumferential grooves within outer and inner ball races 170 and 190, respectively. Circumferential grooves of different form factor 125 and 127 belong to outer ball race 170 and grooves 135 and 137 to inner ball race 190, respectively.

Reference is now made to FIG. 7 showing a partial view of the wheeled case lying sidelong on horizontal surface (ground) 321. According to this specific embodiment of the present invention, supporting members 320 are disposed on a side surface of said chamber 310 for supporting the case lying sidelong. The case rests on outer tire rim 184 of axle-free wheel and supporting members 320 thereat outer tire rim 184 and supporting members 230 belong to one plane and reliably support the case.

Figure 8A:
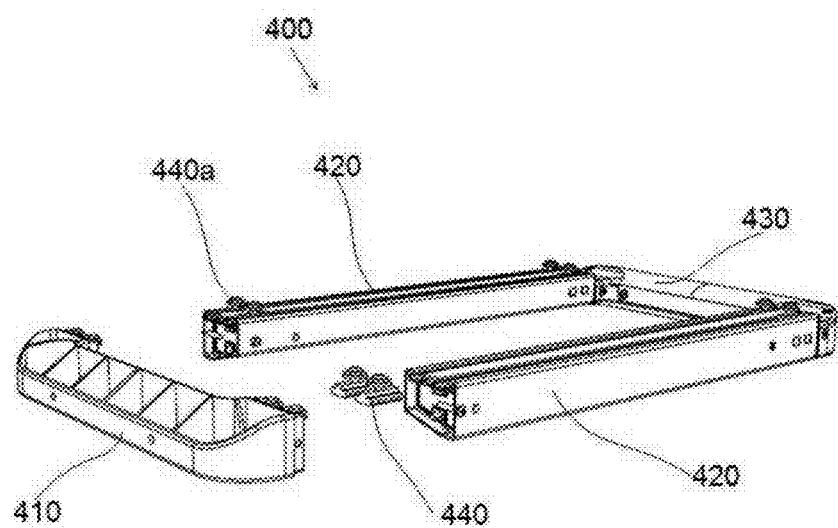
FIG. 8A is an exploded isometric view of a telescopic handle arrangement.

Reference is now made to FIG. 8A showing an exploded isometric view of handle telescopic arrangement 400. The aforesaid arrangement comprises handle 410, telescopic profile 420 and terminal member 430. Numeral 440 and 440a refer to attaching means for attaching handle telescopic arrangement 400 in free and mounted positions, respectively. Telescopic profile 420 is provided with axial slots configured for receiving sliding member 443 (shown below).

Figure 8B:
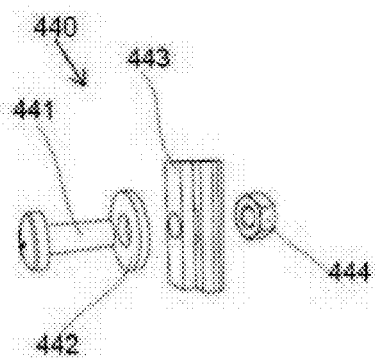
FIG. 8B is an exploded isometric view of a handle fixing arrangement.

Reference is now made to FIG. 8B showing an exploded isometric view of attaching means comprising screw 441, washer 442, sliding member 443 and nut 444.

Figure 8C:
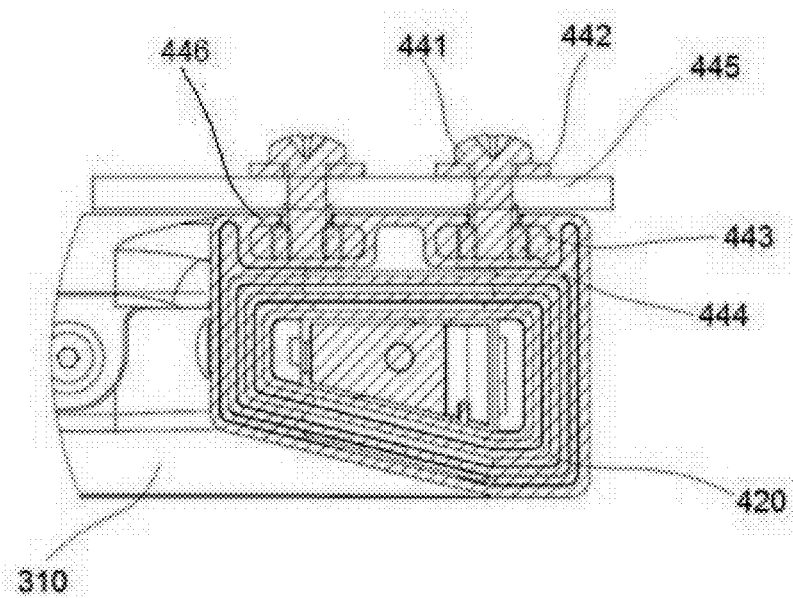
FIG. 8C is an enlarged partial cross-sectional view of telescopic handle arrangement attached to a store chamber.

Reference is now made to FIG. 8C showing a partial cross-sectional view of handle telescopic arrangement 400 attached to plate 445. As said above, sliding member 443 is inserted into profile 446 and screwed up by screw-nut pair 441/444.

Figure 9A:
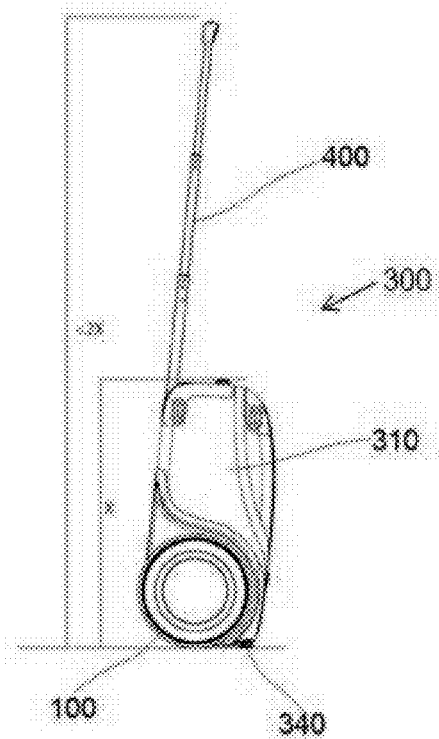
FIGS. 9A and 9B are side schematic views of a case with a handle clamped in different positions.
Figure 9B:
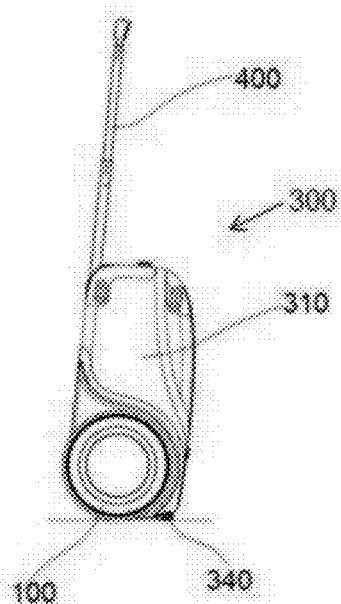

Reference is now made to FIGS. 9A and 9B showing wheeled case with handle telescopic arrangement 400 clamped in different positions. Clamping mechanism controlling handle position is not shown. Maximum deployment of handle telescopic arrangement 400 corresponds to minimum towing force to be applied to the case 300 by an user (not shown).

Figure 9C:
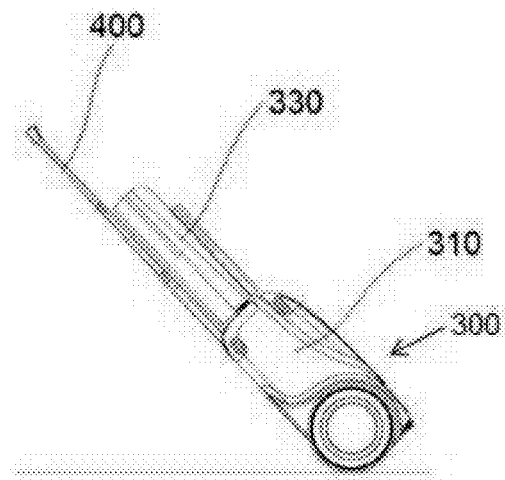
FIG. 9C is a side schematic view of a case with an additional load supported by a telescopic handle.

Reference is now made to FIG. 9C, showing an optional placing additional load 330 onto chamber 310. When case 300 is angularly towed, additional load is supported by telescopic arrangement 400.

Figure 10A:
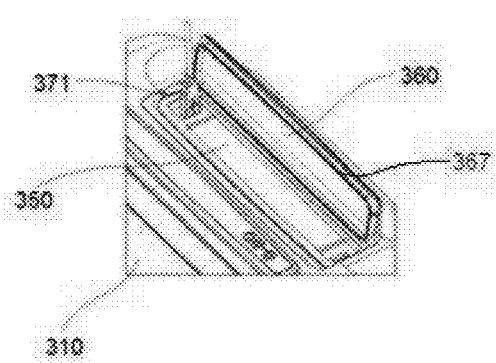
FIGS. 10A to 10D are isometric views of an upper sealable compartment of a case.
Figure 10B:
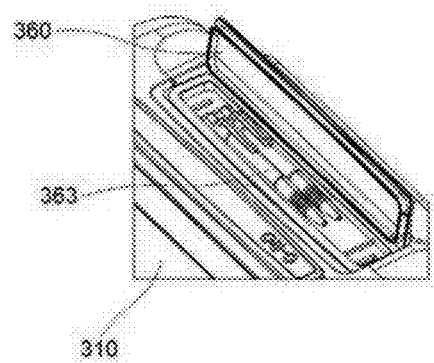

Reference is now made to FIGS. 10A and 10B showing alternative embodiments concerning upper compartment 350 having cover 360 provided with sealer 365. The following options can be located in compartment 350: slot 371 for connecting a cable (electric grid, USB or other options) and office stationery 367.

Figure 10C:
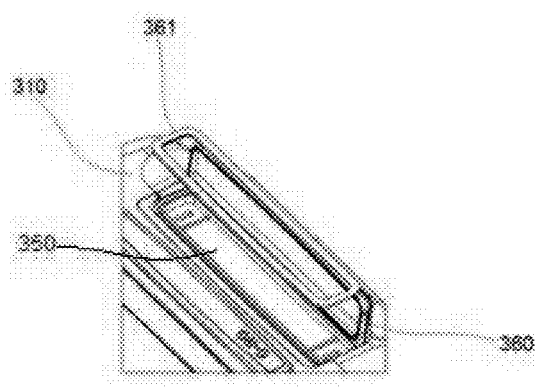
Figure 10D:
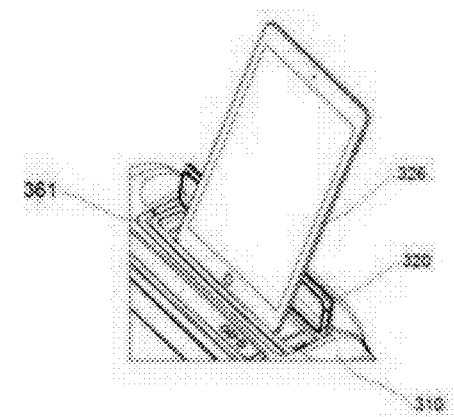
Figure 11A:
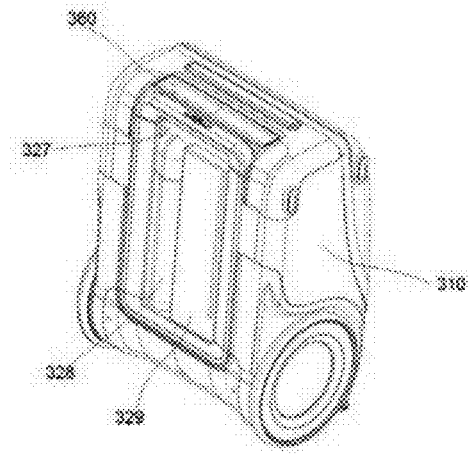
FIGS. 11A to 11D are isometric views of a pocket embodiments of a case.
Figure 11B:
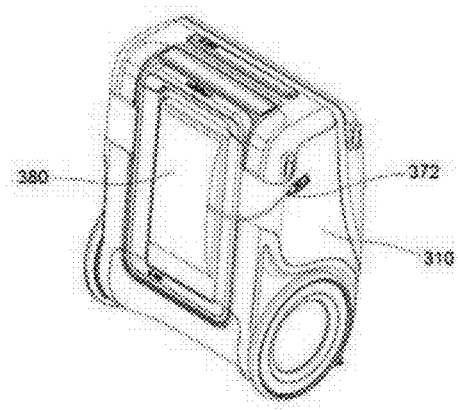
Figure 11C:
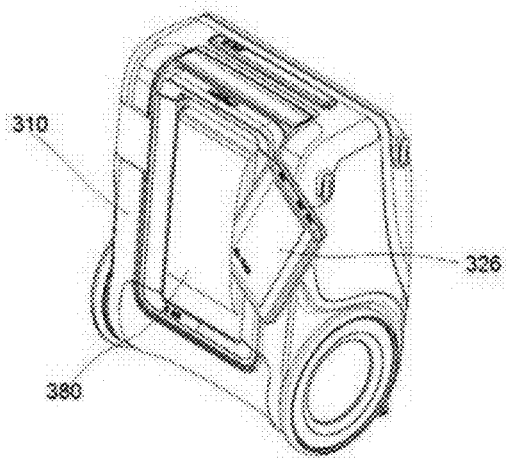
Figure 11D:
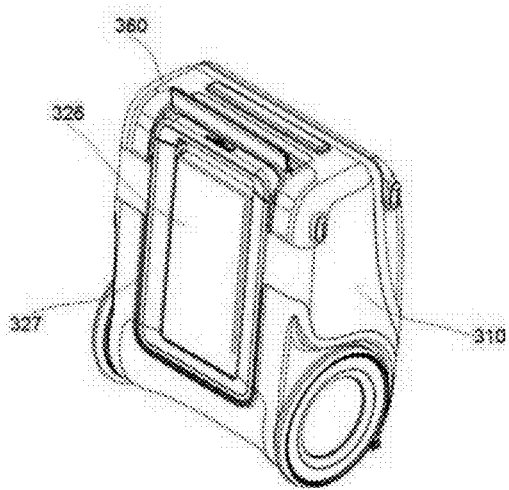

Reference is now made to FIGS. 10C and 10D showing frame 361 which can be deployed from compartment 350. Frame 361 can be used for supporting any mobile device 326.

Reference is now made to FIGS. 11A to 11D, showing alternative embodiment concerning inner partition 380 or an outer recess 327 located on a back surface of the chamber 310. Numerals 328 and 329 refer to optional umbrella and chargeable battery power supply means, respectively. Cable 372 is used for connecting to, for example, USB port.

Figure 12:
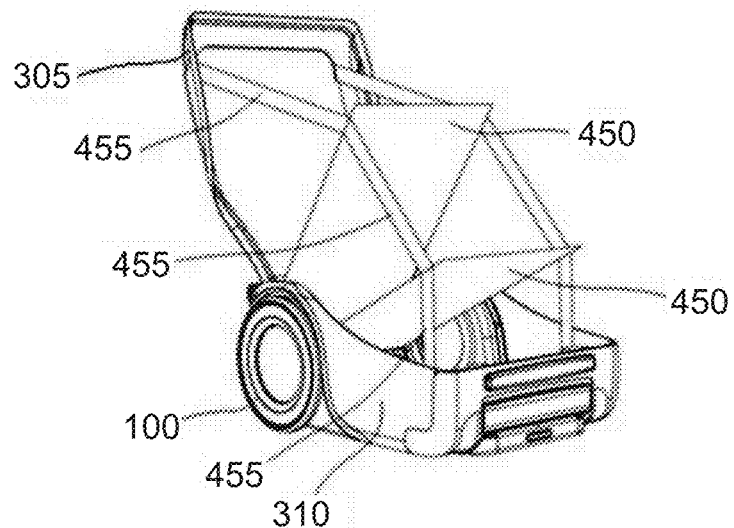
FIG. 12 is an isometric view of a compartmentalized case.

Reference is now made to FIG. 12 showing a compartmentalized wheeled case. According to the specific embodiment of the present invention, chamber 310 is divided by partition members 450 interconnected by straps 455. Outmost members 450 are connected to chamber 310 and cover 305. When the case is opened, members 450 are spaced apart from each other.

Figures 13A, 13B:
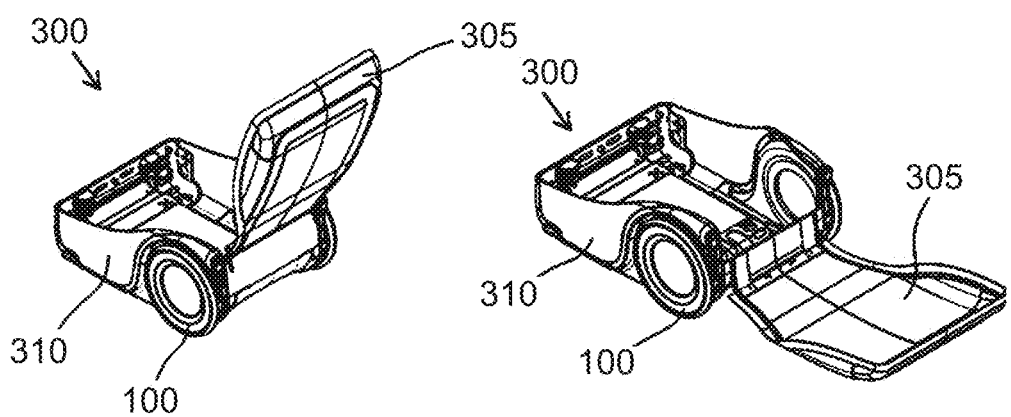
FIGS. 13A and 13B are isometric views of an open case in two different positions.

Reference is now made to FIGS. 13A and 13B showing wheeled case 300 in partial and full open positions (180°).

Figure 14A:
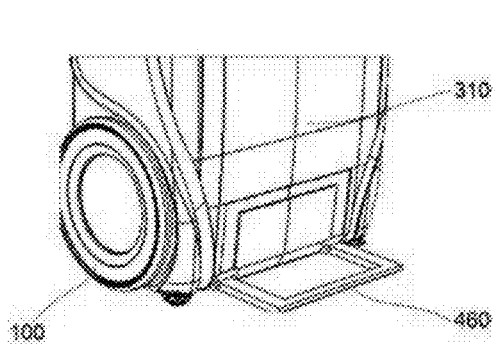
FIGS. 14A and 14B are isometric views of a hinged supporting bracket.
Figure 14B:
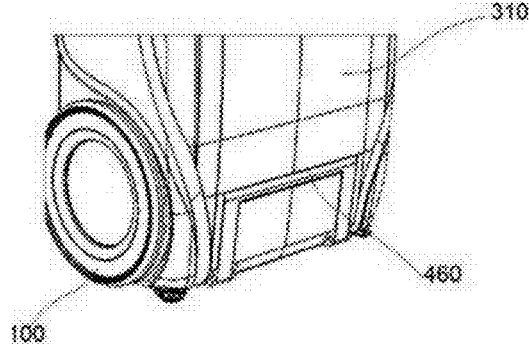

Reference is now made to FIGS. 14A and 14B showing collapsible bracket 460 for supporting said additional load (not shown) in deployed and collapsed position, respectively. Collapsible bracket is hingedly connected to chamber 310.

Figure 15A:
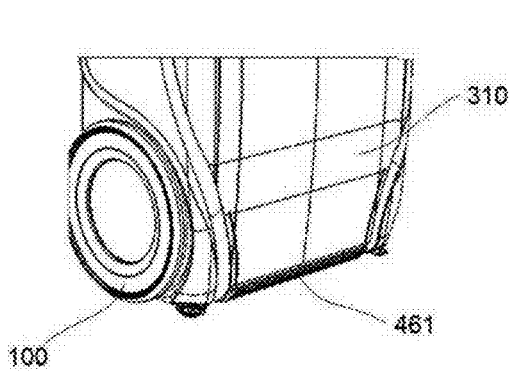
FIGS. 15A and 15B are isometric views of a sliding supporting bracket.
Figure 15B:
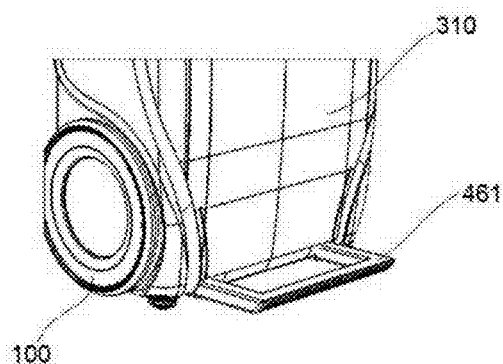

Reference is now made to FIGS. 15A and 15B showing collapsible bracket 461 for supporting said additional load (not shown) in deployed and collapsed position, respectively. Collapsible bracket is connected to chamber 310 in a sliding manner.

Figure 16:
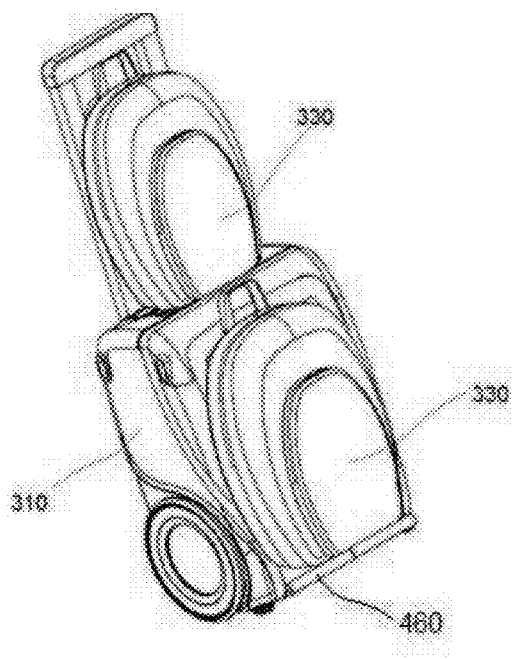
FIG. 16 is an isometric view of a case provided with additional loads.

Reference is now made to FIG. 16 showing optional placing additional loads 330 onto chamber 310 and on bracket 460. When case 300 is angularly towed, additional loads 330 are supported by telescopic arrangement 400 and bracket 460.

Figure 17:
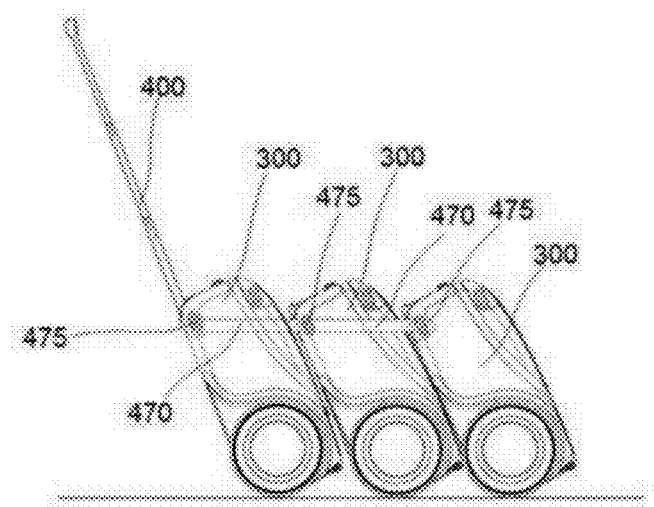
FIG. 17 is an isometric view of cases towed in a group manner.

Reference is now made to FIG. 17 showing group towing a plurality of wheeled cases 300 linked in sequence by straps 470 connected to fastening means 475. Each succeeding wheeled case 300 is supported by preceding case 300.

Figure 18A:
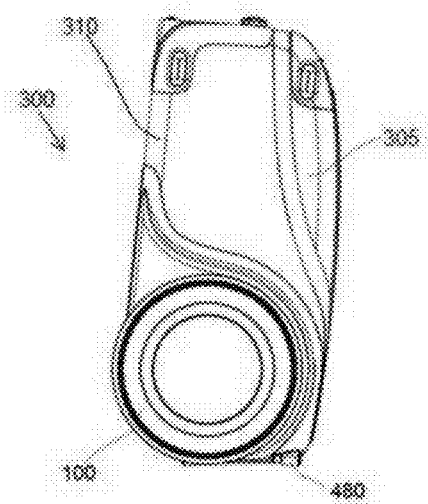
FIG. 18A is a side schematic view of a case vertically standing on supporting members.
Figure 18B:
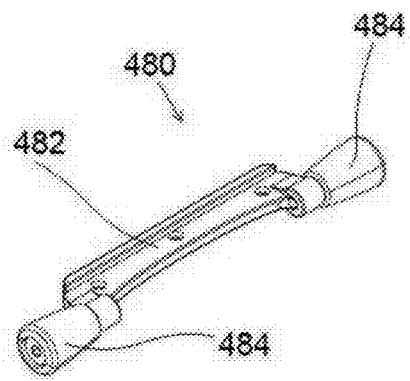
FIGS. 18B to 18D are isometric views of exemplar arrangements of supporting members.
Figure 18C:
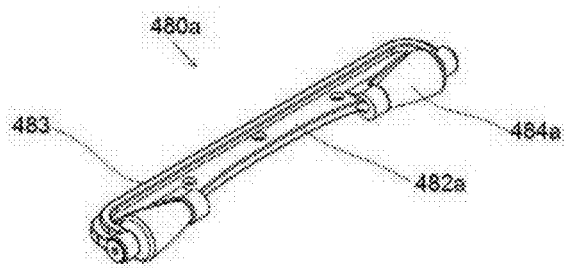
Figure 18D:
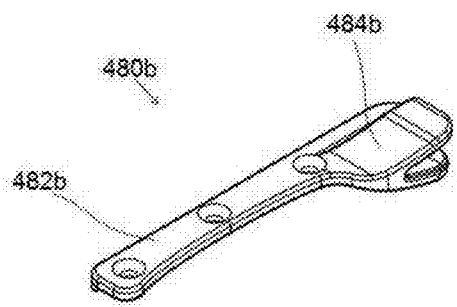

Reference is now made to FIGS. 18A to 18D showing a specific embodiment of the present invention provided with at least four supporting members 480 for stabilizing said case in a vertical position. In FIGS. 18B and 18C, rotatable rollers 484/484a are pairwise connected to plate 482/482a which are attached to a case bottom. Rotation axes of rollers 484/484a are oriented perpendicular to rotation axes said axle-free wheels and enable side displacement of wheeled case 300 without its inclination. Resistance to overturning is increased by means of tapered conical shape with wider conical faces directed outwards the case. Rollers 484a are held by clamp 483. Non-rotating embodiment 480b is shown in FIG. 18D. Supporting member 484b is integrated with plate 482b.

Figure 19A:
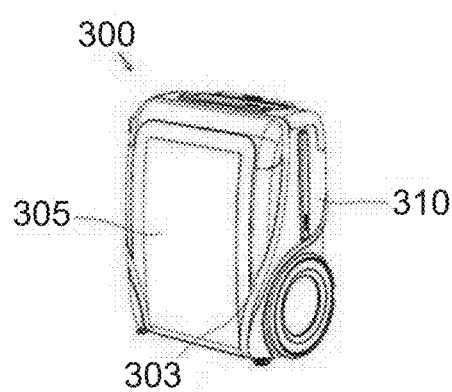
FIGS. 19A and 19b are isometric views of a wheeled case provided with a serpentine zipper.
Figure 19B:
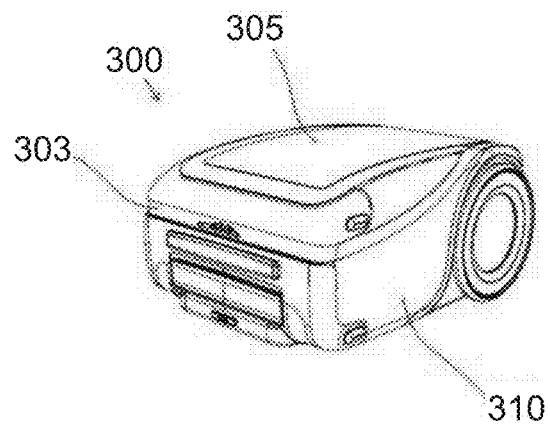

Reference is now made to FIGS. 19A and 19B showing wheeled case 300 of the present invention provided with serpentine zipper 303. Scoop-shaped cover 305 has a curly edge configuration provided with zipper 303

Reference is now made to a Roller-coaster zipper. This zipper stretches along the top, sides, front/back and bottom of the case in order to provide improved stress distribution over a relatively long zipper path which also changes stress direction.

Figure 19C:
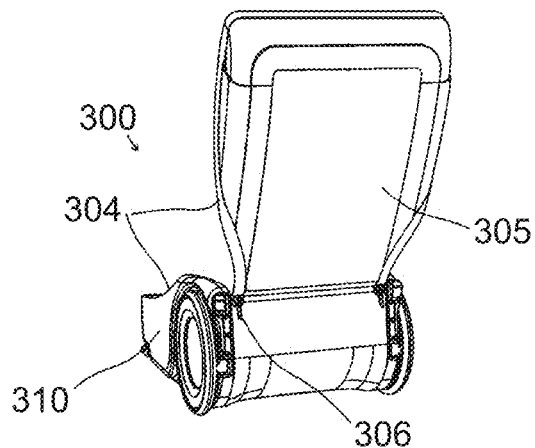
FIG. 19C is an isometric view of an opened wheeled case provided with a serpentine zipper.
Figure 19D:
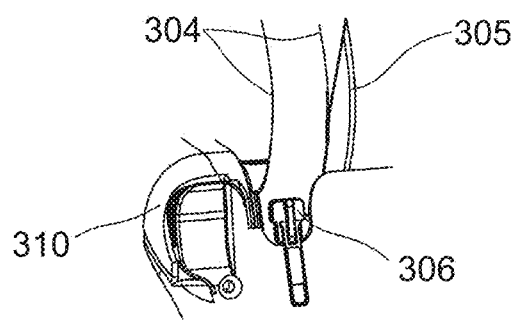
FIG. 19D is an enlarged view of a zipper slider.

Reference is now made to FIG. 19C showing wheeled case 300 in an open position. Numeral 304 refers to jaw members connected to edges of chamber 310 and cover 305. The shown configuration of zipper 303 facilitates total and easy opening and closing wheeled case 300. FIG. 19D provides an enlarged view of slider 306 in its uttermost position.

Figure 20A:
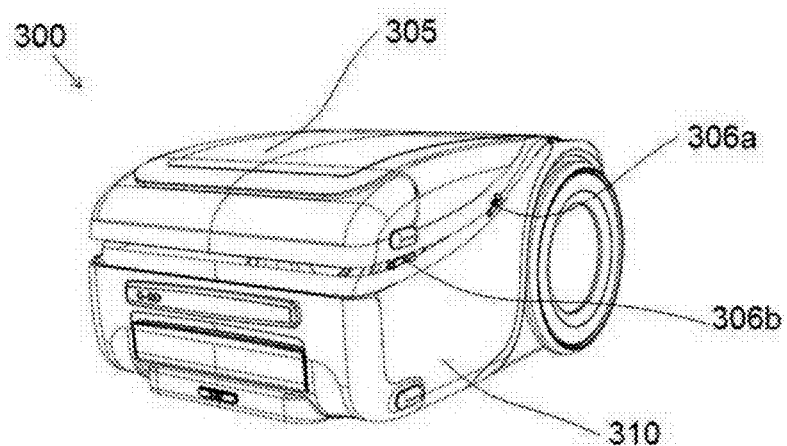
FIG. 20A is an isometric view of an wheeled case provided with a double zipper arrangement.
Figure 20B:
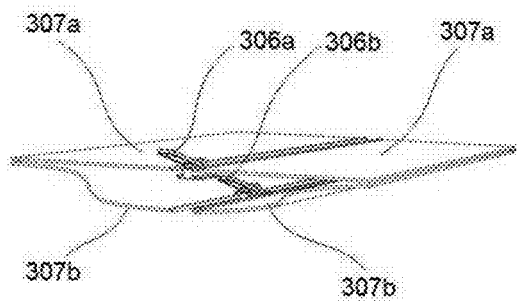
FIGS. 20B and 20C are isometric views of a double zipper arrangement.
Figure 20C:
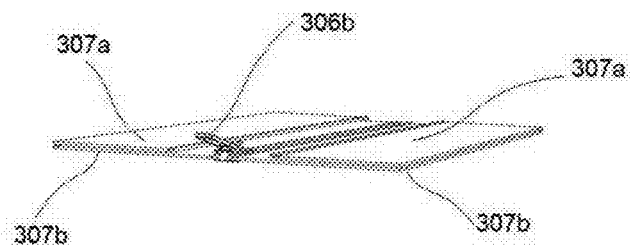

Reference is now made to FIGS. 20A to 20C showing wheeled case 300 provided with a double zipper arrangement. In FIG. 20A, sliders 306a and 306b belong to different zippers. The concept is illustrated by FIGS. 20B and 20C, where sliders 306a and 306b can used in different situation. Specifically, two zippers are sewn one above the other and connect external and internal layers 307a and 307b, respectively. Internal layer 307b forms a bigger enclosure, while external layer 307a a forms a smaller enclosure. When wheeled case 300 is maximally loaded, internal zipper 306b is used. In other circumstances, outer zipper 306a is used. Successive closing internal and outer zippers 306b and 306a, respectively, provides an additional effect of compressing the case innage. Zippers 306a and 306b when used concurrently have also an anti-theft effect.

In the claims, the word "comprises" does not exclude other elements or steps, and the indefinite article "a" or "an" does not exclude a plurality. A single computer or other unit may fulfil the functions of several items recited in the claims. The mere fact that certain measures are recited in mutually different dependent claims does not indicate that a combination of these measured cannot be used to advantage.

The invention has mainly been described above with reference to a few embodiments. However, as is readily appreciated by the skilled addressee, other embodiments than the ones disclosed above are equally possible within the scope of the invention, as defined by the appended patent claims. For example, the roulette wheel may just as well be an automatic or electronic roulette wheel, where a dealer is not controlling the game. In such an example, the roulette ball may circulate in the roulette bowl by means of compressed air ejecting the ball into the bowl. Furthermore, the computer generated gaming information for each slot may just as well be provided by a projector arranged to project the computer generated gaming information adjacent the slots.

What is claimed is:

1. A wheeled luggage case, comprising:
   a. a storage chamber;
   b. a cover defining an opening on at least one side of said storage chamber for providing ready access therein; and
   c. at least two axle-free wheels operatively connected to said chamber for towing said case along a ground surface in a tilted position,
   wherein said storage chamber comprises a front surface, a back surface opposite said front surface, and two side surfaces,
   wherein each of the at least two axle-free wheels is mounted to one of the two side surfaces and comprises:
      (i) an outer rim member having a ground interface on an external surface thereof and an outer ball race or rolling race on an inner surface thereof;
      (ii) an inner rim member having an inner ball or rolling race on an outer surface thereof; and
      (iii) rolling means distributed between said inner and outer ball races by a separator wherein said axle-free wheel further comprises attachment means configured for attaching said axle-free wheel to an object to be transported, and
   wherein the attachment means comprises a plurality of bayonet tabs and a bayonet plate that mounts to a bearing plate on the storage chamber, wherein the bayonet plate includes a plurality of grips coupled to bayonet tabs.

2. The case according to claim 1, comprising a telescopic handle having an open reinforcing profile configured for receiving attaching screws mechanically interconnecting said telescopic handle and a wall of said storage chamber.

3. The case according to claim 2, wherein said telescopic handle is clampable in at least two positions.

4. The case according to claim 2, wherein said telescopic handle is configured for supporting an additional case being placed thereon.

5. The case according to claim 1, comprising at least one supporting shoe in a plane of an external surface of said axle-free wheel such that said case is placeable on a side face thereof.

6. The case according to claim 1, comprising a compartment having a sealable cover.

7. The case according to claim 1, comprising a battery connectable to an electricity source for charging thereof and to user's mobile device for energizing of charging thereof.

8. The case according to claim 1, wherein said user's mobile device is placeable into an element selected from the group consisting of an outer support, an outer partition, inner partition, an outer recess and any combination thereof.

9. The case according to claim 1, wherein said chamber and cover are pivotally movable relative to each other up to 270° opening.

10. The case according to claim 1, wherein said storage chamber is compartmentalized by dividers braced to said storage and cover such that formed compartments are openable when said cover is opened.

11. The case according to claim 1, comprising a collapsible bracket for supporting said additional load.

12. The case according to claim 11, wherein said collapsible bracket is hingedly connected to said case.

13. The case according to claim 11, wherein said collapsible bracket is collapsible in a sliding manner.

14. The case according to claim 1, comprising connecting means for towing said case in a group manner.

15. The case according to claim 1, comprising at least four supporting members for stabilizing said case in a vertical position.

16. The case according to claim 15, wherein said members are rotatable rollers.

17. The case according to claim 16, wherein rotation axes of said rollers are oriented perpendicular to rotation axes said axle-free wheels.

18. The case according to claim 16, wherein said rollers are of tapered conical shape with wider conical face directed outwards said case.

19. The case according to claim 1, comprising supporting members disposed on a side surface of said case for supporting said case lying sidelong; said case rests on an outer tire rim of said axle-free wheel and said supporting members thereat said outer tire rim and supporting members belong to one plane.

20. The case according to claim 1, wherein each of the at least two axle-free wheels is entirely mounted to one of the two side surfaces.

* * * * *